July 23, 1968  E. P. SUNDHOLM  3,393,840
MINIATURIZED HAND GREASE GUN
Filed Aug. 5, 1966  2 Sheets-Sheet 1
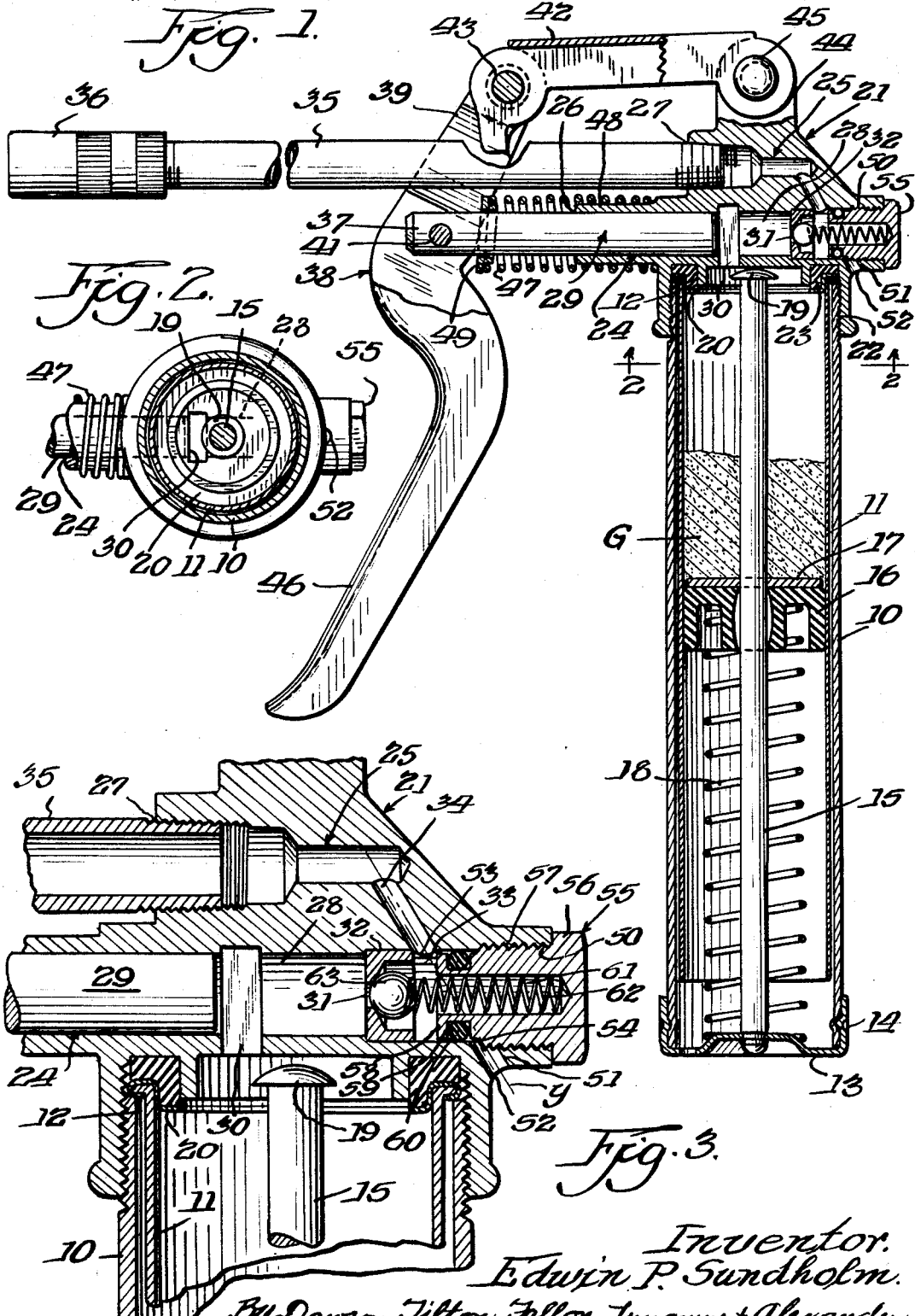
Inventor.
Edwin P. Sundholm.
By Dawson, Tilton, Fallon, Lungmus + Alexander
Attys July 23, 1968 E. P. SUNDHOLM 3,393,840
MINIATURIZED HAND GREASE GUN
Filed Aug. 5, 1966 2 Sheets-Sheet 2
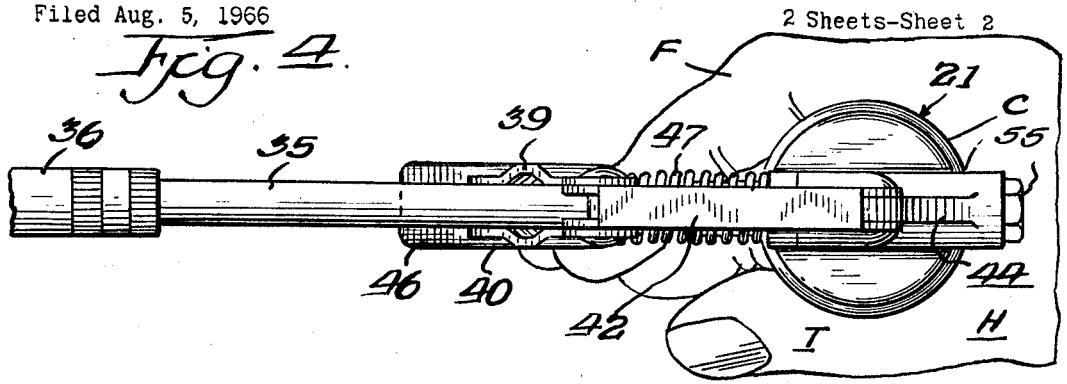
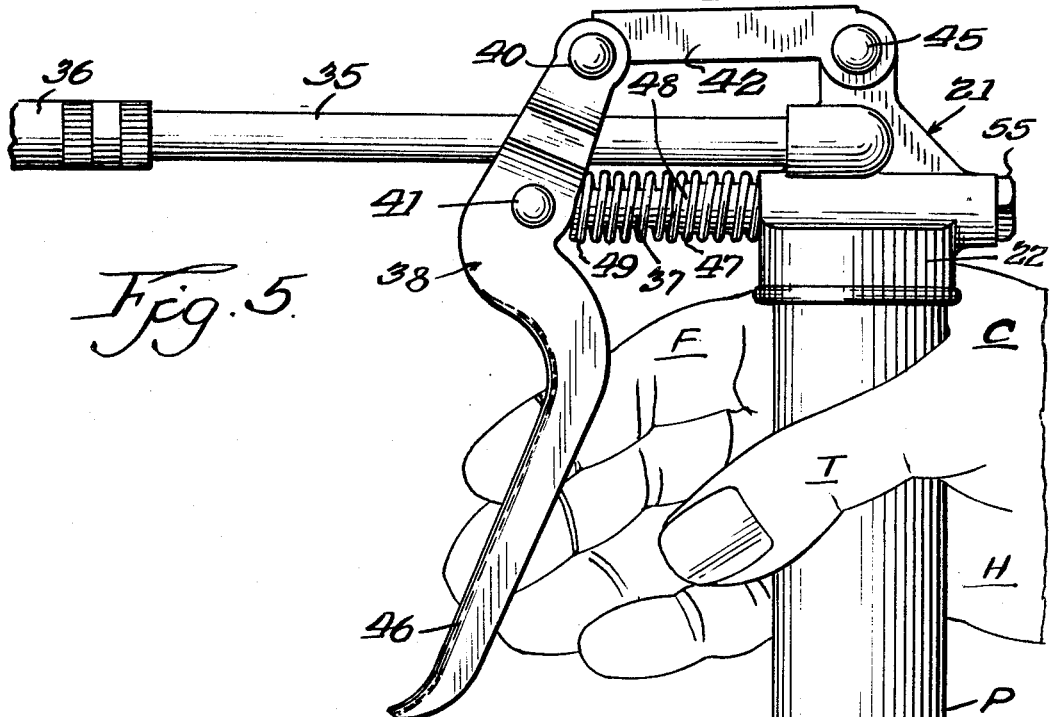
Inventor.
Edwin P. Sundholm.
By Dawson, Tilton, Fallon, Jungmus + Alexander
Att'ys.

3,393,840
MINIATURIZED HAND GREASE GUN
Edwin P. Sundholm, Albert City, Iowa 50510
Filed Aug. 5, 1966, Ser. No. 570,463
7 Claims. (Cl. 222—324)

This invention relates to a miniaturized hand grease gun. The grease gun of this invention has particular utility for use in light duty greasing jobs where only small quantities of grease are applied. The grease gun of this invention is therefore particularly adapted for use by homeowners, mechanics, repair men, etc., for small greasing jobs, such as greasing lawnmowers, garden tractors, etc. For such purposes, compactness of the grease gun, and convenience of operation are particularly important considerations.

Hand grease guns are widely used devices for greasing automobiles, tractors, and similar equipment. For effective greasing, they are designed to connect to a grease fitting and supply grease under high pressure. Grease guns are therefore provided with high pressure grease pumping cylinders having pistons actuated by a lever or pistol-grip handle which will generate grease delivery pressures of at least 8,000 p.s.i. and typically from 10,000–12,000 p.s.i. The grease is stored in the barrel of the gun which may be adapted for use with either bulk grease or cartridge-package grease. Typical capacities are 20 ounces of bulk grease or 14 ounces of cartridge-package grease. For these capacities, the barrels of the gun have outside diameters in excess of 2 inches, such as 2¼–2½ inches. The size and construction of such grease guns virtually requires the use of both hands in their operation. Hand grease guns of this kind, however, are unnecessarily large, cumbersome, and expensive for light duty greasing jobs. The desire for more compact and less expensive grease guns for light duty work conflicts, however, with the desirability of maintaining a high grease delivery pressure with sufficient volume of grease being delivered per stroke.

It is therefore a general object of the present invention to provide a miniaturized hand grease gun which is more compact in size and economical to manufacture while still maintaining ample grease delivery pressure comparable to the pressures developed by larger grease guns. A related object is to provide a grease gun of the character described which is adapted for one-hand use, and which can be conveniently held and operated in one hand. Further objects, advantages, and results will be indicated in the following detailed specification.

A miniaturized hand grease gun embodying the features of the present invention is shown in the accompanying drawings, wherein:

FIGURE 1 is a side elevational view of the miniaturized grease gun, the dispensing head and barrel components being shown in section for purpose of clarity;

FIG. 2 is a fragmentary sectional view taken on line 2—2 of FIG. 1;

FIG. 3 is an enlarged fragmentary sectional view of the dispensing head and upper end of the barrel;

FIG. 4 is a top plan view of the grease gun showing the way the gun would be gripped with the hand for operation; and FIG. 5 is a side elevational view further illustrating the way in which the gun is operated.

The grease gun illustrated in the drawing is adapted for manufacture in small sizes. For example, where the grease gun is to be used with cartridge-package greases, the filled capacity of the gun may range from 2–8 ounces. A typical size is one where the gun can be used with grease cartridges containing 4 ounces of grease. In FIG. 1, a grease gun of this capacity is shown full scale. The barrel 10 has an outside diameter of approximately 1.5 inches and an overall length of about 6.5 inches. The grease cartridge containing the grease has an overall length of about 6 inches and an outside diameter of about 1⅜ inches. As shown in FIGURE 1, the grease has been partially dispensed from the cartridge 11. Ordinarily, however, the cartridges are not completely filled with grease, but some space is left to allow for expansion and contraction of the grease.

Turning now to a more detailed description of the grease gun, it can be seen that the barrel 10 is cylindrical and that it has an open upper end 12. The lower end of barrel 10 is closed by cap 13, which may be permanently secured to the barrel as indicated at 14.

Within barrel 10 there is provided a guide rod 15 which has its lower end extending through and attached to cap 13. Slidably mounted on rod 15 is a plunger assembly consisting of a molded plunger cup 16, and a washer 17. Cup 16 may be formed from a flexible, resilient material, such as grease-resistant synthetic rubber. Plunger cup 16 is resiliently urged toward barrel end 12 by a compression spring 18 which extends between cap 13 and plunger cup 16. The upper end of guide rod 15 is provided with a head 19 which acts as a stop for the plunger assembly when it is engaged by washer 17.

Barrel 10 is adapted to receive the grease-containing cartridge 11. In the illustration given, the cartridge 11 is shown inserted after removal of the end caps. The upper end of cartridge 11 is provided with a cap rim 20 which remains attached to the cartridge and rests on the upper end of the barrel 10, as shown in FIGS. 1 and 2.

A grease dispensing head designated generally by the number 21 is detachably mounted on the upper end of barrel 10. The lower portion of head 21 provides an internally-threaded mounting cup or ring 22 which engages the external threads on the upper end portion of barrel 10. Mounted within cup 22 is a sealing gasket 23 which seals with the rim 20 of cartridge 11. The functions and advantages of this particular gasket arrangement are described more fully in my copending application Ser. No. 534,734, filed Mar. 16, 1966, and entitled "Gasket and Dispensing Head Assembly for Cartridge Grease Gun."

In accordance with the present invention, head 21 provides two transversely extending passages designated generally by the numbers 24 and 25. As will be noted, the passages 24 and 25 extend toward one side of head 21 and terminate in openings 26 and 27, which are on the same side of the head. In the embodiment shown, passage 24 is below passage 25, and the passages have generally parallel central axes, and their axes are at right angles to the axis of barrel 10. While this construction is preferred, the precise arrangement and angular relation shown can be varied while still achieving the results of the invention.

One of the head passages, namely the passage 24 provides a grease pumping cylinder 28. The cylinder 28 is adapted for the high pressure pumping of grease by co-operating with the piston 29 which is slidably received in passage 24. Cylinder 28 provides an inlet end which communicates with the interior of barrel 10 (and thereby the interior of grease cartridge 11) through a port 30. The discharge end of cylinder 28 communicates with passage 25 through a port 31 provided by cup 32. In the embodiment shown, port 31 communicates with an extension 33 of passage 24, which in turn communicates with a connecting passage 34 and extends to the end of passage 25 and away from or inwardly of opening 27, as shown particularly in FIG. 3.

A grease application pipe 35 extends laterally outwardly from the side of the head providing openings 26 and 27, as shown more completely in FIGURE 1. Pipe 35 is attached to head 21 in alignment with the open end 27 of passage 25. In the embodiment shown, the inner end of pipe 35 is threaded for connection to the internally threaded outer portion of passage 25. It will be understood that pipe 35 receives grease from passage 25. The outer end of pipe 35 may be equipped with a coupler 36, which is adapted for connection to a grease fitting.

As will be noted, actuating portion 37 projects laterally beyond side opening 26.

Actuating handle means designated generally by the number 38 is pivotally mounted on the outer end of the piston actuating portion 37. In the embodiment shown, the upper bifurcated portion of the handle means 38 provides two spaced arms 39 and 40 as shown more clearly in FIG. 4, which extend around the piston actuating portion 37 and straddle grease pipe 35 for relative motion with respect thereto. The outer end of the piston actuating portion 37 is pivotally connected to the arms 39 and 40 by a rivet pin 41. The upper ends of arms 39 and 40 are pivotally connected to a link member 42 having a U-shaped cross section by a rivet pin 43. The inner end of link 42 is pivotally connected to an upward extension 44 of head 21 by rivet pin 45.

The lower portion of handle means 38 provides a finger grip section 46 having a U-shaped cross section with the bottom of the U outwardly to provide a smooth surface for the fingers. As will be noted, the finger grip section 46 extends downwardly along barrel 10. It will be understood that the spacing of finger grip section 46 with respect to barrel 10 is variable depending on the position of piston 29 as it is moved inwardly and outwardly by the reciprocation of handle means 38. The handle means 38 is biased to an outward position by a compression spring 47 which has its inner portion around the extension 48 of head 21 and its outer portion around the piston actuating extension 37, as shown more clearly in FIGS. 1 and 5. A washer 49 may be provided between the outer end of spring 47 and the inner edges of handle arms 39 and 40.

In accordance with the present invention, barrel 10 has a restricted or limited outside diameter, the outside diameter of the barrel being dimensioned so that it may be retainingly gripped in the cleft of one hand between the thumb and forefinger in the manner indicated in FIGS. 4 and 5. As there shown, a hand is gripping the barrel 10 with the thumb T extending around one side of the barrel and the forefinger F extending around the other side of the barrel so that the barrel is received in the cleft between the thumb and forefinger. When gripped in this manner, the barrel 10 is further steadied by resting against the palm, as indicated in FIG. 5. The fingers of the hand, including the forefinger may then be extended outwardly onto and partially around the finger grip portion 46. This permits the gun to be held and operated with one hand. The tips of the fingers may alternatively be applied to and removed from the finger grip portion 14 while the barrel 10 is held securely without any need to employ the other hand for either holding the barrel or operating the handle means 38. If desired, the other hand can be used for guiding the coupler 36 onto the grease fitting. It will be appreciated that the gun may be grasped and operated in the manner described with either the left or the right hand. For average size hands, barrel 10 preferably has an outside diameter of from 1¼ to 1¾ inches.

The passage-providing portions of head 21 may be conveniently formed from an integral casting such as a die casting. The passages 24 and 25 may be originally formed in the die casting. The die cast holes may then be bored, tapped, or otherwise machined as required to provide a smooth sliding seal between cylinder 28 and piston 29 and to provide for the attachment of grease pipe 35. Preferably, the entire passage 24 including the extension 33 is formed by die casting, and the extension 33 terminates in an opening 50 on the opposite side of head 21 from the openings 26 and 27. The connecting passage 34 may be advantageously formed by a drilling operation after the die casting of the head 21. Preferably, the connecting passage 34 comprises the inner end portion of a straight bore 51 which is adjacent the opposite side of head 21 from the openings 26 and 27. As shown in FIGS. 1 and 3, the bore 51 extends inwardly from an opening 52 in the outer surface of the side head 21 providing the opening 50. As shown more clearly in FIG. 3, the bore 51 extends across the adjacent end portion of passage 24, more specifically across the passage extension 33 so that the passage end portion provides connections at 53 and 54 with bore 52. It will be noted that the connection 53 provides communication between the passage extension 33 and the connecting passage 34 which extends to passage 25, while the connection 54 if not closed would provide communication with the outside of head 21 through opening 52.

Bore 51 may be formed by an angular drilling operation along the line y, as indicated in FIG. 3. By having the axis y of bore 51 inclined inwardly at an acute angle with respect to the axis of barrel 10, a particularly advantageous construction is achieved. More specifically, the bore connection 53 is spaced further from the side of the head 21 providing the opening 50, which is the side opposite the openings 26 and 27, than the bore connection 54. In other words, the lower end of passage portion 34 at connection 53 is further inward (that is, further within the head 21) than the bore connection 54.

In accordance with the present invention, means is provided for selectively closing the bore connection 54 while leaving the bore connection 53 open. In the embodiment shown, this means comprises a plug designated generally by the number 55, as shown more clearly in FIG. 3. Plug 55 includes a head 56 which bears against the adjacent side of dispensing head 21, and intermediate threaded portion 57, which is threadedly received within the outer portion of passage extension 33, and an inner end 58 providing an annular groove or seat 59. Seat 59 is positioned so that it is inwardly of bore connection 54 and outwardly of bore connection 53. A sealing gasket O-ring 60 is received in the annular seat 59 for sealing co-action with the adjacent wall portion of passage extension 33. O-ring 60 is formed of flexible, resilient material, such as grease-resistant synthetic rubber. With the positioning of the O-ring 60 as described, the outer portion of bore 52 is effectively closed and sealed, while the inner portion of the bore providing connecting passage 34 remains open and unobstructed.

Plug 55 can also be utilized to perform other functions. It may be provided with a cylindrical recess 61 extending toward its outer end from the inner end 58. A compression spring 62 is received within recess 61, the projecting inner end of the spring bearing against a ball valve 63, which is urged into seating relation with the seat provided by cup 32 around the outer side of port 31. It will be understood that spring 62 permits valve 63 to release and move off of its seat.

*Operation*

The operation of the grease gun will be apparent from the foregoing description. However, it may be briefly summarized as follows. After the grease gun has been loaded with a grease cartridge (or with bulk grease if a cartridge is not used), the dispensing head 21 is attached to the open end of the barrel 10. The fully assembled grease gun appears as shown in FIGS. 4 and 5. To dispense the grease, the barrel is grasped between the thumb and fingers with the fingers extending around the grip 46 of handle means 38. By pulling the hand grip toward the barrel, piston 29 is moved into cylinder 32 and which causes grease to pass outwardly through port 31, connecting passage 34, and passage 25 into grease pipe 35 for delivery to a grease fitting through coupler 36. The construction of head 21 and the associated operating and dispensing components provides for the dispensing of grease under high pressure with an adequate volume of grease being dispensed at each stroke. By relaxing finger pressure on the hand grip 46, it will return to the position shown in FIG. 1, where the piston 29 is in the position for the next stroke. It will be understood that the return of the piston will create suction within the cylinder 28, which will assist the flow of grease through port 30. The grease is also urged toward port 30 by the action of spring 18 on the plunger cup 16.

While in the foregoing specification this invention has been described in relation to a specific embodiment thereof and many details have been set forth for purpose of illustration, it will be apparent to those skilled in the art that the invention is susceptible to additional embodiments and that certain of the details described herein can be varied considerably without departing from the basic principles of the invention.

I claim:

1. A dispensing head for a hand grease gun providing two transversely-extending passages terminating at openings on the same side of said head,
   one of said passages providing a grease pumping cylinder therein having an inlet and a discharge end,
   said inlet end being adapted to communicate with the interior of a grease gun barrel and said discharge end communicating with the other of said passages inwardly of its said side opening,
   said passages being connected by a straight bore adjacent the opposite side of said head from the side having said openings,
   said bore extending from the outer surface of said opposite side across the adjacent end portions of said one passage so that said end portion provides a first connection with the portion of said bore extending to said other passage and a second connection with a portion of said bore extending to said outer surface, and
   means for selectively closing said second bore connection while leaving said first bore connection open.

2. The dispensing head of claim 1 wherein the said portion of said one passage adjacent said opposite side of said head extends beyond both of said connections with said bore to an opening in said opposite side, the said bore connections to said other passage being further from said opposite side opening than the said bore connection to said outer surface, said selective closing means comprising a plug having an outer portion received in said one passage extension, the inner end portion of said plug having a sealing gasket O-ring mounted thereon, said O-ring being located outwardly of said first bore connection and inwardly of said second bore connection.

3. The dispensing head of claim 2 wherein said plug is threadedly received in said one passage extension and is removable therefrom, said plug having a bore extending from its inner end, a spring means received within said plug bore and having an inner portion projecting from said plug into said one passage adjacent grease cylinder discharge end, valve seat providing means disposed in said one passage at said cylinder discharge end, and valve means mounted on the projecting end of said spring and being releasably urged into seating relation with said valve seat by said spring means.

4. In a miniaturized hand grease gun, the combination comprising:
   a vertically aligned cylindrical barrel having an open upper end, said barrel having an outside diameter dimensioned to be gripped in the cleft of one hand between the thumb and forefinger;
   a grease dispensing head detachably mounted on said barrel upper end, said head providing two transversely extending passages terminating in openings on the same side of said head, one of said passages providing a grease-pumping cylinder therein having an inlet end and a discharge end, said inlet end communicating with the interior of said barrel and said discharge end communicating with the other of said passages inwardly of its said side opening;
   a grease application pipe extending laterally outward from the side of said head providing said passage opening, said pipe being attached to said head in alignment with said other passage side opening for receiving grease from said other passage;
   a piston slidably received in said one passage for pumping cooperation with said cylinder, said piston having an actuating portion extending outwardly through said one passage side opening in the direction as said grease pipe;
   actuating handle means pivotally mounted on said piston actuating portion, said handle means providing a finger grip section extending downwardly along said barrel in variable spaced relation thereto and and upwardly extending bifurcated portion straddling said grease pipe; and
   link means positioned above said grease pipe in vertical alignment with said grease pipe and said piston, said link means pivotally connecting the upper ends of said bifurcated portion to a second pivotal connection provided on top of said dispensing head.

5. The combination of claim 4 wherein said barrel has an outside diameter of from about 1¼ to 1¾ inches.

6. In a hand grease gun having a vertically extending cylindrical barrel with an open upper end, a grease dispensing head detachably mounted on said barrel upper end, a grease application pipe extending laterally outward from one side of said head, a slidable piston extending outwardly from said one side of said head, and actuating handle means pivotally mounted on the outward extending portion of said piston, wherein the improvement comprises said head providing two transversely extending passages terminating in openings on the same side of said head, one of said passages providing a grease pumping cylinder therein having an inlet end and a discharge end and receiving said piston, said inlet end communicating with the interior of said barrel and said discharge end communicating with the other of said passages inwardly of its said side opening which side opening connects to said grease pipe, said passages being connected by a straight bore adjacent the opposite side of said head from the side having said openings, said bore extending from the outer surface of said opposite side across the adjacent end portion of said one passage so that said end portion provides a first connection with the portion of said bore extending to said other passage and a second connection with the portion of said bore extending to said outer surface, and means for selectively closing said second bore connection while leaving said first bore connection open.

7. The combination of claim 6 wherein the said portion of said one passage adjacent the said opposite side of said head extends beyond both of said connections with said bore to an opening in said opposite side, the said bore connections to said other passage being further from said opposite side opening than the said bore connection to said outer surface, said selective closing means comprising a plug having an outer portion received in said one passage extension, the inner end portion of said plug having a sealing gasket O-ring mounted thereon, said O-ring being located ouwtardly of said first bore connection and inwardly of said second bore connection.

References Cited

UNITED STATES PATENTS 1,900,668    3/1933    Roselund _____ 222—324

FOREIGN PATENTS 314,428    7/1956    Switzerland.
360,255    3/1962    Switzerland.

ROBERT B. REEVES, *Primary Examiner.*

HADD S. LANE, *Assistant Examiner.*